(12) United States Patent
Gormley

(10) Patent No.: US 9,964,071 B2
(45) Date of Patent: May 8, 2018

(54) DECOUPLED TRANSLATING SLEEVE

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 532 days.

(21) Appl. No.: 14/595,432

(22) Filed: Jan. 13, 2015

(65) Prior Publication Data

US 2016/0201604 A1 Jul. 14, 2016

(51) Int. Cl.
*F02K 1/00* (2006.01)
*F02K 1/76* (2006.01)
*F02K 1/72* (2006.01)

(52) U.S. Cl.
CPC ............ *F02K 1/76* (2013.01); *F02K 1/72* (2013.01); *F05D 2250/314* (2013.01); *F05D 2250/41* (2013.01)

(58) Field of Classification Search
CPC ... F02K 1/76; F02K 1/763; F02K 1/64; F02K 1/70; F02K 1/72
See application file for complete search history.

(56) References Cited

U.S. PATENT DOCUMENTS

| | | | | |
|---|---|---|---|---|
| 4,922,711 A | * | 5/1990 | Brown | F02K 1/563 239/265.27 |
| 5,040,730 A | * | 8/1991 | Hogie | F02K 1/70 239/265.23 |
| 2008/0053061 A1 | * | 3/2008 | McCall | F01D 25/28 60/226.1 |
| 2009/0288386 A1 | * | 11/2009 | Marshall | F02K 1/09 60/204 |
| 2009/0301056 A1 | * | 12/2009 | Hatrick | F02K 1/72 60/226.2 |

* cited by examiner

*Primary Examiner* — Gerald L Sung
(74) *Attorney, Agent, or Firm* — Snell & Wilmer, L.L.P.

(57) ABSTRACT

A thrust reverser for a nacelle may include a translating sleeve. A plurality of linkless blocker doors may be coupled to the translating sleeve. The translating sleeve may translate along a line of action which is non-parallel to an engine centerline. The non-parallel translation of the translating sleeve may prevent interference between the translating sleeve and surrounding components.

17 Claims, 8 Drawing Sheets

DECOUPLED TRANSLATING SLEEVE

FIELD

The present disclosure relates to a turbofan engine system and, more specifically, to thrust reverser systems.

BACKGROUND

Gas turbine engine systems for modern aircraft often include a thrust reverser incorporated into a nacelle. The thrust reverser may redirect the flow of air through the nacelle in order to apply a reverse thrust to the aircraft. Various thrust reversers include a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. The blocker doors typically may be hinged to the translating sleeve and coupled to the inner fixed structure via a drag link. As the translating sleeve translates aft, the drag link pulls the blocker doors inward, pivoting them into the bypass air duct. The linkage between the blocker doors and the inner fixed structure is facilitated when the translating sleeve translates parallel to the engine centerline. Otherwise, arrangements would be necessary for the drag links to move in more than two dimensions with more difficult to design hinge points, etc.

As engines become larger, more powerful, and increase in bypass ratio, surrounding structures limit the available packaging area for the nacelle. For example, aircraft wings, wing slats, pylons, and nozzles may interfere with locations directly aft of a translating sleeve, which may limit the space for the translating sleeve to translate along the engine centerline.

SUMMARY

A nacelle configured to house an engine may comprise a thrust reverser and a plurality of blocker doors. The thrust reverser may comprise a translating sleeve configured to translate between a stowed position and a deployed position. The plurality of blocker doors may be coupled to the translating sleeve. The translating sleeve may comprise a line of action which is non-parallel to a centerline of the engine. In response to the translating sleeve translating along the line of action from the stowed position to the deployed position, the plurality of blocker doors may be configured to deploy within a bypass air duct of the nacelle.

A nacelle for an aircraft engine may comprise a thrust reverser. The thrust reverser may comprise a first translating sleeve configured to translate along a first line of action. The first line of action may be nonparallel to a centerline of the aircraft engine. A first linkless blocker door may be coupled to the first translating sleeve.

A nacelle may be adapted for housing an engine. The nacelle may comprise a thrust reverser component configured to translate along a line of action. The line of action may be non-parallel to a centerline of the engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A thrust reverser for a nacelle may comprise a translating sleeve. The translating sleeve may comprise a line of action that is non-parallel to a centerline of the engine. The thrust reverser may comprise linkless blocker doors, such that the blocker doors are not coupled to the inner fixed structure of the nacelle. As the translating sleeve translates aft, the translating sleeve may also translate downward, outward, or any other direction that is non-parallel to the engine centerline. The non-parallel movement may allow the translating sleeve to translate while avoiding interference with other structures, such as the aircraft wing.

Figure 1:
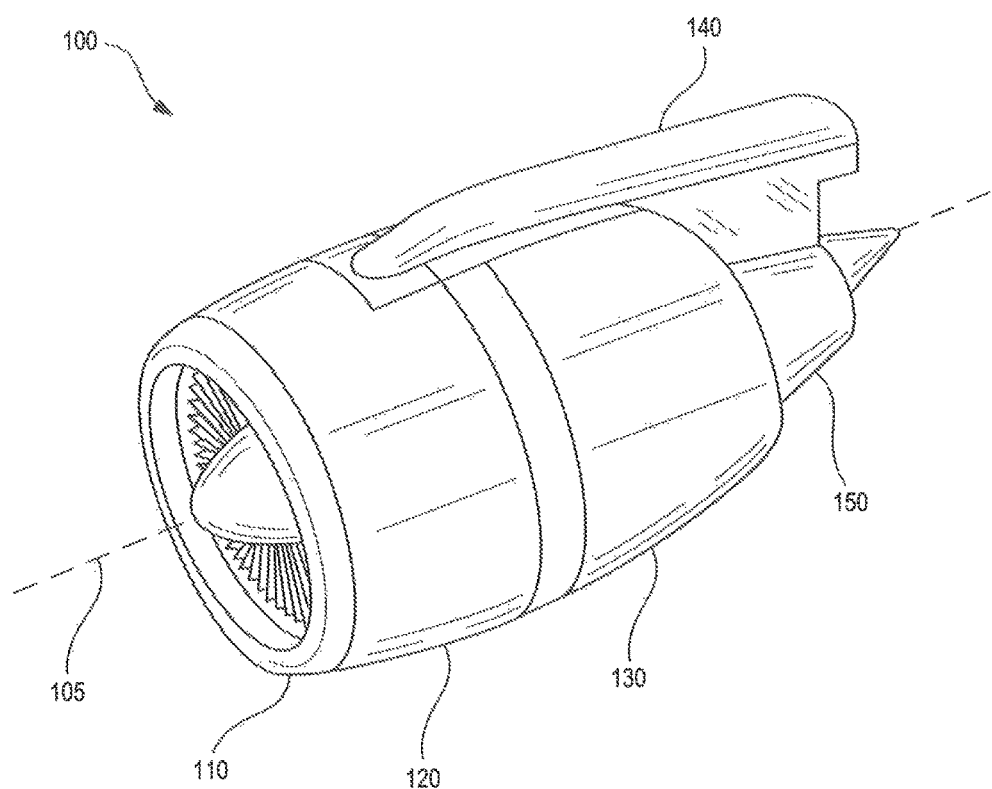
FIG. 1 illustrates a perspective view of a nacelle in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may he coupled to a pylon 140 (only part of which is shown), which may mount the nacelle 100 to an aircraft wing or aircraft body. Nacelle 100 may further comprise an exhaust nozzle 150. The thrust reverser 130 may comprise a cascade-type thrust reverser, in which bypass air is directed through a cascade in order to apply a reverse thrust to an aircraft, such as during landing. The nacelle 100 may be disposed about a centerline 105, which may also be the axis of rotation of an engine located within the nacelle 100.

Figure 2A:
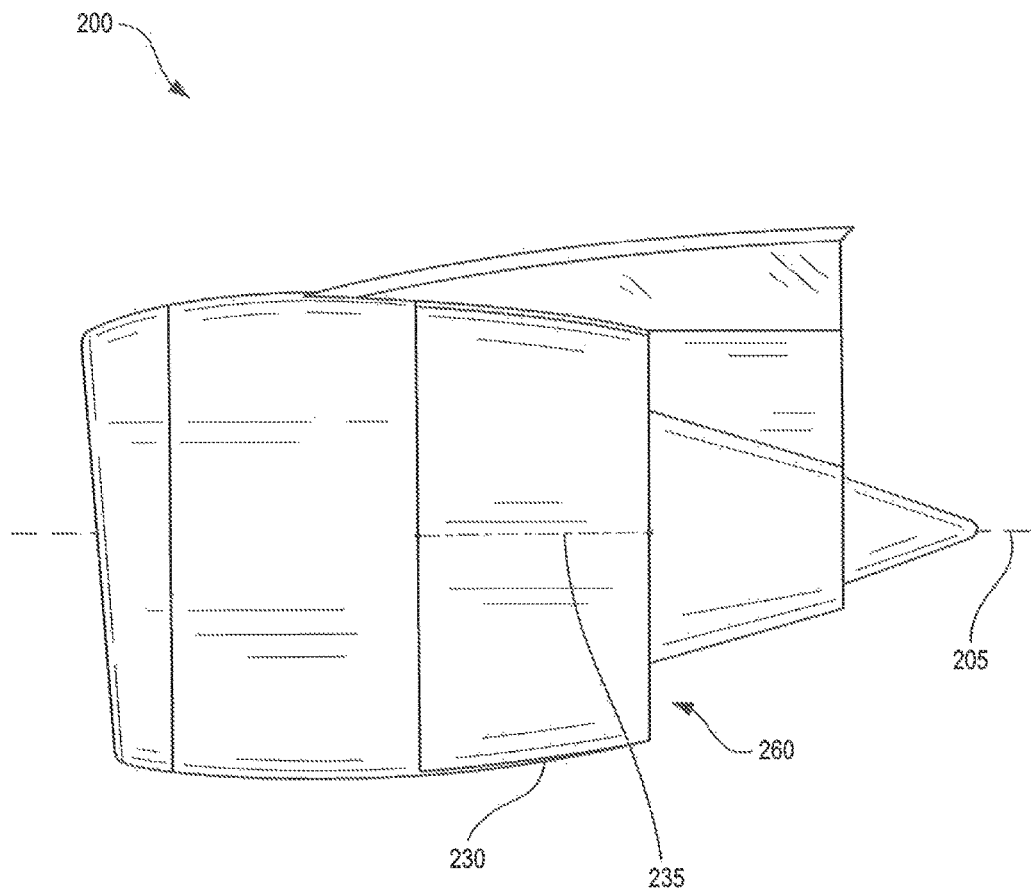
FIG. 2A illustrates a side view of a prior art nacelle in accordance with various embodiments.

Referring to FIG. 2A, a side view of a prior art nacelle 200 is illustrated according to various embodiments. Nacelle 200 may comprise a translating sleeve 230 for a thrust reverser. The translating sleeve is a component which slides along two sets of track and sliders in a known manner between a stowed and deployed position. When the translating sleeve translates to its deployed position, blocker doors are traditionally caused to be simultaneously deployed and an exit flow path through a set of flow redirecting cascades is exposed. The translating sleeve 230 may comprise a line of action 235 that is parallel to a centerline 205 of an engine within the nacelle 200. The line of action 235 defines the direction that the translating sleeve 230 translates between its deployed and stowed positions. A plurality of blocker doors may be pivotally coupled to the translating sleeve. Each blocker door may be coupled to an inner fixed structure via a drag link in the bypass air duct 260.

Figure 2B:
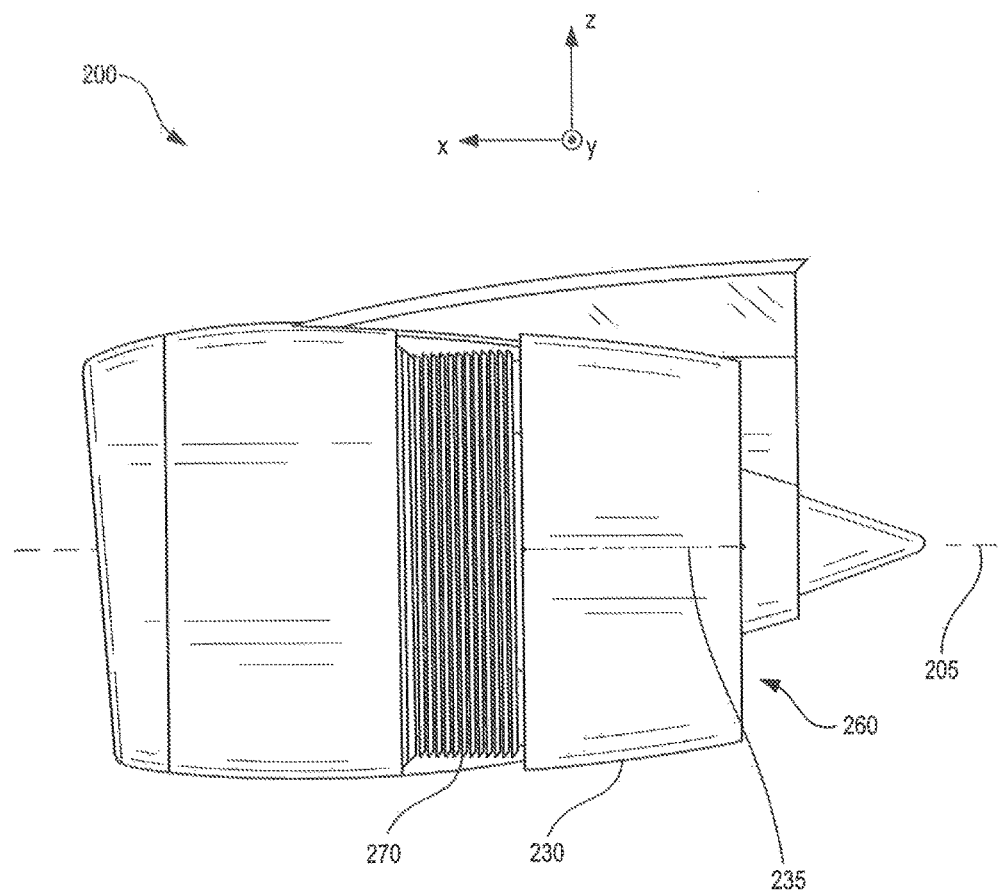
FIG. 2B illustrates a side view of a prior art nacelle with a translating sleeve in a deployed position in accordance with various embodiments.

Referring to FIG. 2B, the nacelle 200 is illustrated with the translating sleeve 230 in the deployed position. X-y-z axes are shown for ease of illustration. In order to deploy the thrust reverser, the translating sleeve 230 is translated in the aft direction (negative x-direction) along the line of action 235. The line of action 235 for the translating sleeve 230 has traditionally been parallel to the centerline 205, as illustrated in FIG. 2B, in order to facilitate deployment of the blocker doors with simple drag links pivotally attached to the inner fixed structure. In the deployed position, air in the bypass air duct is blocked from reaching the bypass duct nozzle by the blocker doors, and is instead redirected outward and forward through the cascades 270.

Figure 3A:
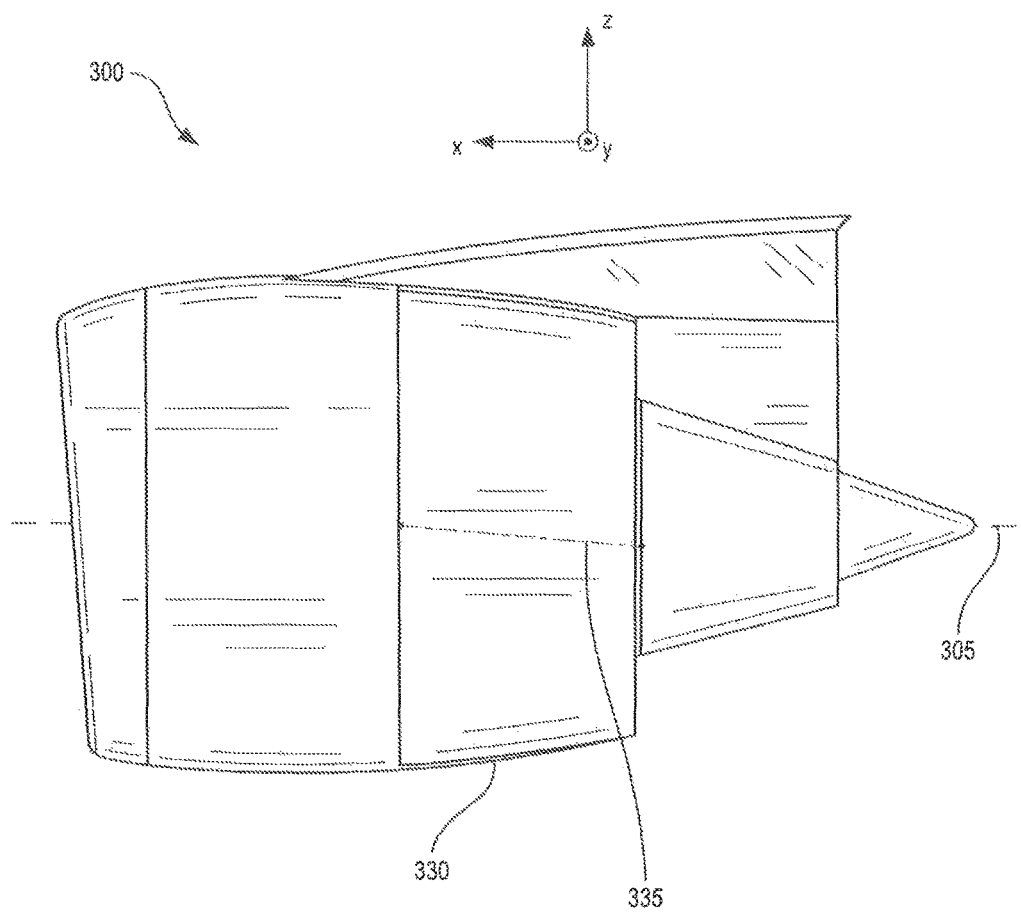
FIG. 3A illustrates a side view of a nacelle with a decoupled translating sleeve in accordance with various embodiments.
Figure 3B:
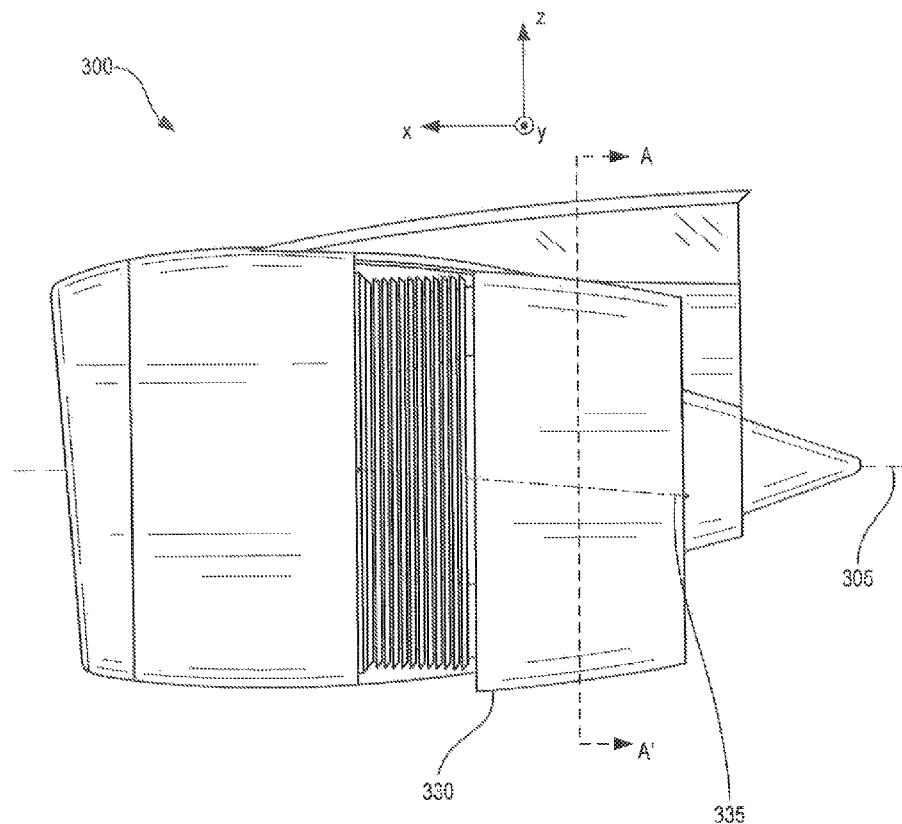
FIG. 3B illustrates a side view of a nacelle with a decoupled translating sleeve in the deployed position in accordance with various embodiments.
Figure 3C:
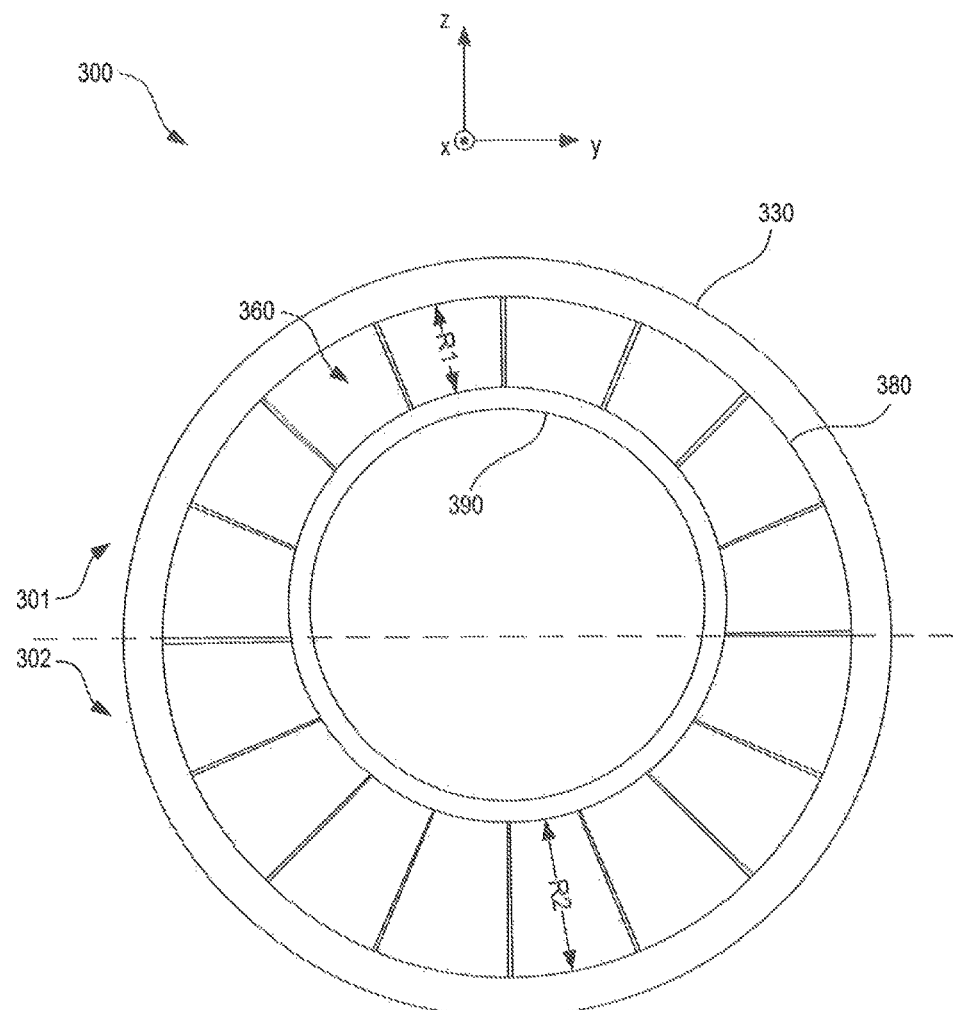
FIG. 3C illustrates a cross section view of a nacelle with a decoupled translating sleeve in the deployed position in accordance with various embodiments.

Referring to FIG. 3A, a side view of a nacelle 300 comprising a decoupled translating sleeve 330 is illustrated according to various embodiments. As used herein, a "decoupled" translating sleeve refers to a translating sleeve that translates in any direction that is non-parallel to the engine centerline 305. For instance, and as is shown in FIGS. 3A, 3B, and 3C, the translating sleeve 330 may translate along a line of action 335. The translating sleeve 330 may translate along a track and slider mechanism which defines the line of action 335. The line of action 335 may be non-parallel to the engine centerline 305. Thus, the translating sleeve 330 may translate along the line of action 335 in an aft and downward direction (negative x and negative z-direction, respectively).

Referring to FIG. 3B, a side view of the nacelle 300 is illustrated with the decoupled translating sleeve 330 in a deployed position. The translating sleeve 330 may translate in an aft and downward direction along the line of action 335 non-parallel to the engine centerline 305. The downward component (negative z-component) of the translation may allow for additional clearance between the translating sleeve 330 in its deployed position and various other aircraft components, such as the aircraft wing, wing slats, or pylon.

Referring to FIG. 3C, a cross-section view of nacelle 300 taken along A-A' in FIG. 3B with the thrust reverser deployed is illustrated. A plurality of blocker doors 380 may he coupled to the translating sleeve 330. The blocker doors 360 may be linkless blocker doors, which means that the blocker doors 380 are not coupled to the inner fixed structure ("IFS") 390 by drag links or other kinematic mechanisms. A non-limiting example of a thrust reverser with linkless blocker doors can be found in the co-pending patent application Ser. No. 14/222,192 filed Mar. 21, 2014, which is incorporated herein by reference to the extent necessary to explain an example of a linkless blocker door system. In the stowed position, the blocker doors 380 may be substantially flush with, or located within, the translating sleeve 330. As shown in the deployed position, the blocker doors 380 may pivot into the bypass air duct 360 between the translating sleeve 330 and the IFS 390. The blocker doors 380 may be deployed into the bypass air duct 360 by any of a variety of mechanisms, such as an electric motor which drives the blocker doors 380 into the bypass air duct 360. In various embodiments, because the translation sleeve 330 translates downward (as used herein, the term downward refers to the direction shown as the negative z-direction) with respect to the IFS 390, the translating sleeve 330 and the IFS 390 may not be concentric in the deployed position. Thus, in various embodiments, the blocker doors 380 may be different sizes in order to sufficiently block airflow through the bypass air duct 360. For example, the blocker doors 380 in the upper half 301 of the nacelle 300 may have a smaller radial length R1 than a radial length R2 of the blocker doors 380 in the lower half 302 of the nacelle 300. Radial length as measured herein extends from the IFS 390 to the translating sleeve 330 in a direction orthogonal to engine centerline 305.

Figure 4A:
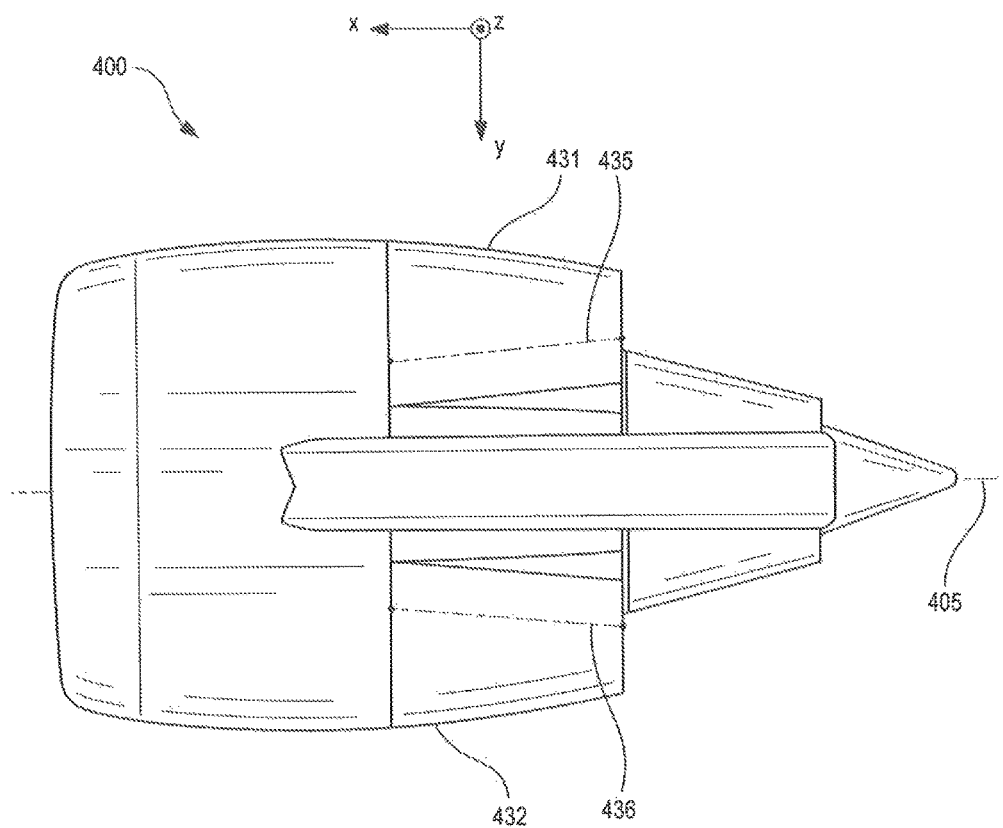
FIG. 4A illustrates a top view of a nacelle with a split thrust reverser in accordance with various embodiments.

Referring to FIG. 4A, a top view of a nacelle 400 with a split thrust reverser in a stowed position is illustrated according to various embodiments. The thrust reverser may comprise an inboard translating sleeve 431 and an outboard translating sleeve 432. The inboard translating sleeve may translate along a first line of action 435, and the outboard translating sleeve 432 may translate along a second line of action 436. The first line of action 435 and the second line of action 436 may he non-parallel to the engine centerline 405.

Figure 4B:
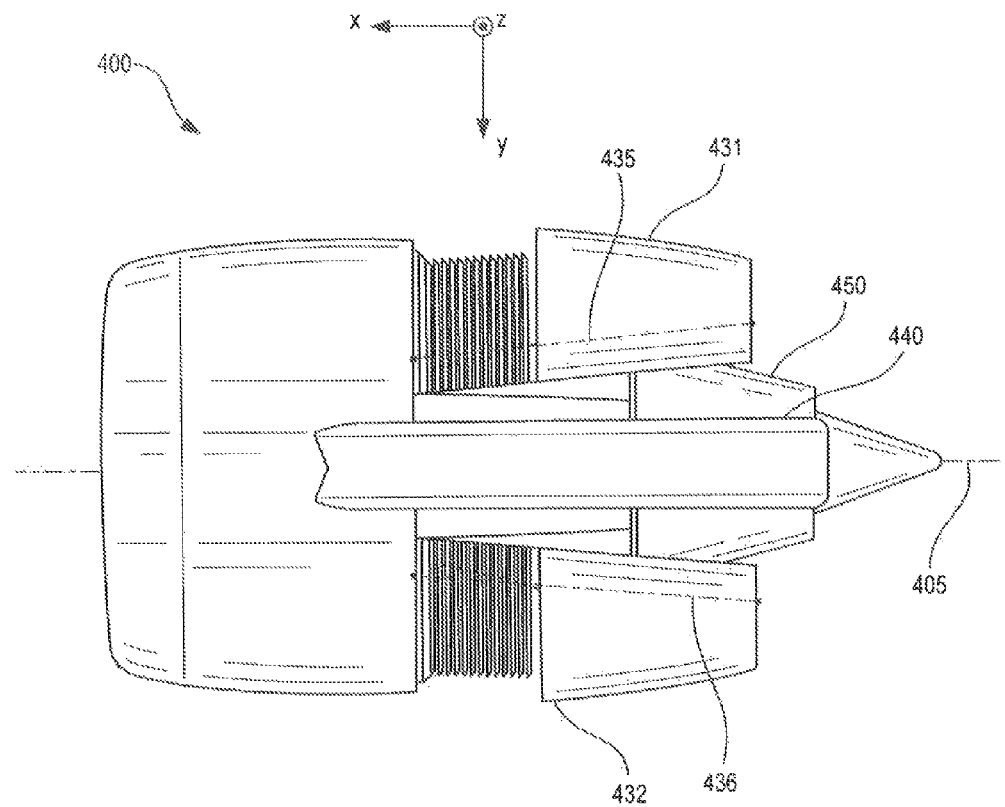
FIG. 4B illustrates a top view of a nacelle with a split thrust reverser in the deployed position in accordance with various embodiments.

Referring to FIG. 4B, a top view of the nacelle 400 with the thrust reverser in the deployed position is illustrated according to various embodiments. The inboard translating sleeve 431 may translate along the first line of action 435 in the aft direction (negative x-direction) and the inboard direction (negative y-direction) away from the engine centerline 405. The outboard translating sleeve 432 may translate along the second line of action 436 in the aft direction (negative x-direction) and the outboard direction (positive y-direction) away from the engine centerline 405. Thus, the inboard translating sleeve 431 and the outboard translating sleeve 432 of the thrust reverser may translate aft and radially outward from the engine centerline 405 to the deployed position. The radially outward translation may prevent interference between the translating sleeves 431, 432 and surrounding components, such as the nozzle 450, pylon 440, or an aircraft wing.

In various embodiments, the translating sleeves disclosed herein may be used in conjunction with a variable area fan nozzle system (VAFN). The exhaust area of the bypass duct is generally sized for cruise conditions to provide the maximum operating efficiency. However, a VAFN system, generally positioned at the aft end of the translating sleeve, may increase the overall efficiency of the aircraft by creating an adjustable bypass duct exhaust area to increase the operating efficiency of the engine in non-cruise operating scenarios (e.g., take-off, climb, and descent).

Translating sleeves have been disclosed herein which translate downward or radially outward relative to the engine centerline. However, those skilled in the art will appreciate that translating sleeves may translate in any direction non-parallel to the engine centerline in accordance with various embodiments the present disclosure. By utilizing linkless blocker doors, the direction of translation of the translating sleeves may be more easily decoupled from the engine centerline, and the translating sleeve may translate in various directions to comply with space constraints.

In addition to translating sleeves, the foregoing principles may also be beneficially applied to other thrust reverser components. For example, if a translating VAFN is attached to the aft end of the thrust reverser, it may be provided with a set of tracks and sliders which define its line of action (between a stowed and deployed condition) as non-parallel to the engine centerline. This might help the VAFN avoid clashing with other aircraft components such as the wing, etc. Likewise, in some proposed thrust reverser systems a larger group of components in addition to the translating sleeve is arranged to translate aft on a set of tracks and sliders in order to gain access to the engine. These tracks and sliders might also be /langed to define the line of action as non-parallel to the engine centerline in order to improve packaging while eliminating a possible clash with other aircraft components.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to he limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may he present in an embodiment. B alone may be present in an embodiment, C alone may he present in an embodiment, or that any combination of the elements A, B and C may be present in a single embodiment; for example, A and B, A and C, B and C. or A and B and C. Different crosshatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims, No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A nacelle configured to house an engine, the nacelle comprising:
    a thrust reverser comprising a translating sleeve configured to translate between a stowed position wherein the translating sleeve is concentric with an inner fixed structure of the nacelle and a deployed position wherein the translating sleeve is not concentric with the inner fixed structure of the nacelle; and
    a plurality of blocker doors rotatably coupled to the translating sleeve, wherein the translating sleeve comprises a line of action which is non-parallel to a centerline of the engine, and wherein in response to the translating sleeve translating along the line of action from the stowed position to the deployed position, the plurality of blocker doors are configured to rotate relative to the translating sleeve and deploy within a bypass air duct of the nacelle.

2. The nacelle of claim 1, wherein the plurality of blocker doors are linkless blocker doors.

3. The nacelle of claim 1, wherein a first blocker door in the plurality of blocker doors comprises a longer radial length than a second blocker door in the plurality of blocker doors.

4. The nacelle of claim 1, wherein the translating sleeve is configured to translate aft and downward relative to the centerline of the engine.

5. The nacelle of claim 1, wherein the translating sleeve is configured to translate radially outward from the centerline of the engine.

6. The nacelle of claim 1, wherein the line of action is defined by a track and slider mechanism.

7. A nacelle for an aircraft engine comprising:
    a thrust reverser comprising a first translating sleeve configured to translate along a first line of action, wherein the first line of action is non-parallel to a centerline of the aircraft engine, a first linkless blocker door rotatably coupled to the first translating sleeve, and a second linkless blocker door rotatably coupled to the first translating sleeve, wherein the second linkless blocker door comprises a larger radial length than a radial length of the first linkless blocker door.

8. The nacelle of claim 7, further comprising a second translating sleeve configured to translate along a second line of action, wherein the second line of action is non-parallel to the centerline of the aircraft engine.

9. The nacelle of claim 8, wherein the second line of action is non-parallel to the first line of action.

10. The nacelle of claim 7, wherein in a deployed position, the first translating sleeve is not concentric with an inner fixed structure of the nacelle.

11. The nacelle of claim 10, wherein in a stowed position, the first translating sleeve is concentric with the inner fixed structure.

12. The nacelle of claim 7, wherein the first translating sleeve is configured to translate aft and downward relative to the centerline of the aircraft engine.

13. A nacelle adapted for housing an engine, the nacelle comprising:
   a thrust reverser component configured to translate along a line of action, wherein the line of action is non-parallel to a centerline of the engine;
   a first plurality of linkless blocker doors rotatably coupled to an upper half of the nacelle; and
   a second plurality of linkless blocker doors rotatably coupled to a lower half of the nacelle,
   wherein a radial length of each of the first plurality of linkless blocker doors is smaller than a radial length of each of the second plurality of linkless blocker doors.

14. The nacelle of claim 13, wherein the thrust reverser component is a translating sleeve.

15. The nacelle of claim 13, wherein the thrust reverser component is a translating VAFN.

16. The nacelle of claim 13, wherein the thrust reverser component is configured to provide access to the engine in response to the thrust reverser component translating in an aft direction along the line of action.

17. The nacelle of claim 13, wherein the thrust reverser component is configured to translate aft and downward relative to the centerline of the engine.

* * * * *